Patented Sept. 4, 1923.

1,466,687

UNITED STATES PATENT OFFICE.

WILHELM BAUER, OF OPLADEN, NEAR COLOGNE, GERMANY, ASSIGNOR TO FARBEN-FABRIKEN VORM. FRIEDR. BAYER AND CO., OF LEVERKUSEN, NEAR COLOGNE-ON-THE-RHINE, GERMANY.

INDIGOID VAT DYE.

No Drawing.   Application filed August 8, 1921.   Serial No. 490,714.

*To all whom it may concern:*

Be it known that I, WILHELM BAUER, citizen of Germany, residing at Opladen, near Cologne, Germany, have invented new and useful Improvements in Indigoid Vat Dyes, of which the following is a specification.

The present invention relates to the manufacture and production of new and valuable indigoid vat dyestuffs. They can be produced by condensing halogenated derivatives of isatin compounds, e. g., isatins, naphthisatins in which isatin compounds the oxygen of the alpha-keto group is replaced by an easily movable or replaceable substituent, e. g., halogen, the anilido group, sulfur, the amino group, the alkoxy group with 1-oxy-6-naphthol ethers and their substitution products or homologues having a free ortho-position with regard to the 1-hydroxy group. The resulting coloring matters can be further treated with halogenizing agents in order to augment the fastness of the dyes. By this treatment halogen enters into the naphthol nucleus most probably in paraposition to the hydroxy group.

The new dyes are in a dry state from dark blue to black powders soluble in concentrated sulfuric acid generally with a blue coloration; being scarcely soluble in organic solvents with a bluish coloration; and which yield with hydrosulfite and caustic soda lye yellowish vats dyeing cotton after exposure to air from blue-black to dark green colors.

In order to illustrate the new process more fully, I can proceed as follows, the parts being by weight:—216 parts of dichloroisatin are converted in a dry benzene suspension into dichloroisatin-alpha-chlorid by heating it with 72 parts $PCl_5$. The mixture thus obtained is then poured into a solution which is well stirred of 190 parts of 6-methoxy-1-naphthol in dry benzene. The stirring is continued for a short time and the dye which separates whilst cooling is filtered off and washed. It has in a free state most probably the following formula:

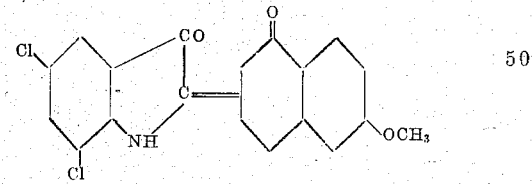

and is a dark blue crystalline powder with a copper-like lustre scarcely soluble in hot benzene with a light blue and in concentrated sulfuric acid with a dark blue coloration. By addition of $SO_2Cl_2$ to its suspension in benzene an intense bluish-red coloration is obtained by heating. It yields with hydrosulfite and NaOH a yellow vat from which cotton is dyed a fast greyish-blue. Deeper shades are black.

By treating the dye with chlorinating agents e. g. by treating it in chlorobenzene with $SO_2Cl_2$ at about 70° C. a black dye is obtained.

From dibromo beta-naphthisatinchlorid and 6-methoxy-1-naphthol a product is obtained dyeing from the hydro-sulfite vat cotton in olive green fast shades, showing still faster shades after a further chlorination. From 1-chloro-2.3-naphthisatinchlorid and 6-methoxy-1-naphthol a greenish-grey dye results.

I claim:—

1. The herein described new indigoid vat dyestuffs being derived from an alpha-derivative of a halogen substituted isatin compound and an 1-oxy-6-naphthol-ether which contain halogen in the benzene nucleus of the isatin compound used and which may contain halogen in the naphthol nucleus, which coloring matters are, after being dried and pulverized, from dark blue to black powders soluble in concentrated sulfuric acid generally with a bluish coloration; and dye cotton from an alkalin hydrosulfite vat generally from blue-black to dark green fast shades, substantially as described.

2. The new indigoid vat dyestuff having most probably the formula:

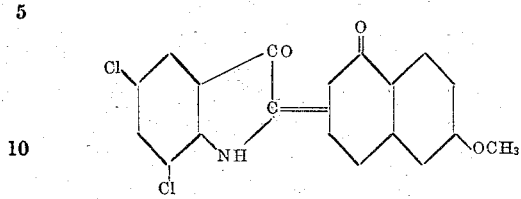

which is after being dried a dark blue crystalline compound soluble in concentrated sulfuric acid with a blue coloration, being scarcely soluble in hot benzene with a light blue coloration, yielding with hydrosulfite and caustic soda lye a yellow vat dyeing cotton greyish-blue to black fast shades and being converted by a further chlorination into a black dye substantially as described.

In testimony whereof I have hereunto set my hand in the presence of two subscribing witnesses.

WILHELM BAUER.

Witnesses:
 HELEN NUFER,
 FRANCES NUFER.